(12) United States Patent
Ledford

(10) Patent No.: US 10,882,593 B1
(45) Date of Patent: Jan. 5, 2021

(54) PELLER BLADE WITH A FLAP

(71) Applicant: Gary Alan Ledford, Florissant, CO (US)

(72) Inventor: Gary Alan Ledford, Florissant, CO (US)

(*) Notice: Subject to any disclaimer, the term of this patent is extended or adjusted under 35 U.S.C. 154(b) by 0 days.

(21) Appl. No.: 16/945,648

(22) Filed: Jul. 31, 2020

Related U.S. Application Data

(63) Continuation-in-part of application No. 29/718,170, filed on Dec. 20, 2019.

(60) Provisional application No. 62/946,324, filed on Dec. 10, 2019.

(51) Int. Cl.
  *B63H 1/28* (2006.01)
  *B63H 1/26* (2006.01)
  *F03D 1/06* (2006.01)
  *B63H 1/20* (2006.01)

(52) U.S. Cl.
  CPC .................. *B63H 1/28* (2013.01); *B63H 1/26* (2013.01); *F03D 1/06* (2013.01); *B63H 1/20* (2013.01)

(58) Field of Classification Search
  CPC ... B63H 1/00; B63H 1/14; B63H 1/26; B63H 1/28; F03D 1/00; F03D 1/06; F03D 11/00; F03D 13/10; F03D 1/0633; F03D 1/0641; F03D 1/0675; F03D 7/00; F03D 13/00
  USPC ..... 440/49; 416/205, 224, 228, 235, 237, 62
  See application file for complete search history.

(56) References Cited

U.S. PATENT DOCUMENTS

| | | | |
|---|---|---|---|
| 8,517,683 B2* | 8/2013 | Miocevich | B63H 1/26 416/62 |
| 2012/0134817 A1* | 5/2012 | Bagepalli | F03D 1/0675 416/62 |
| 2015/0275855 A1* | 10/2015 | Pal | F03D 13/10 416/224 |

* cited by examiner

*Primary Examiner* — Lars A Olson

(57) ABSTRACT

A peller device with a flap is an apparatus used to enhance the capabilities and efficiency of water circulation and aeration systems. The apparatus is configured to act as both a propeller and an impeller as necessary for a particular water circulation requirement. A flap is an addition to the blade tip which propels a fluid by pushing against the fluid, thus enabling the peller to function as a propeller. In addition, the flap facilitates the generation of a sucking force so the peller can also function efficiently as an impeller. The peller assembly can be encased in circular housings having a vertical axis in which the peller assembly is mounted for rotation on the central axis of the housing. The peller assembly is formed with a hub and a plurality of blades symmetrically positioned around the hub. The flap of the apparatus is attached to the base of the peller assembly.

13 Claims, 7 Drawing Sheets

PELLER BLADE WITH A FLAP

The current application claims a priority to the U.S. Provisional Patent application Ser. No. 62/946,324 filed on Dec. 10, 2019.

The current application is a continuation-in-part (CIP) application of the U.S. non-provisional application Ser. No. 29/718,170 filed on Dec. 20, 2019.

FIELD OF THE INVENTION

The present invention generally relates to the flow and aeration of water circulation systems. More specifically, the present invention provides a flap to enhance the blade of a pump to improve its performance for aeration and low-head circulation systems in aquatic ponds and aquaculture environments.

BACKGROUND OF THE INVENTION

The source and quality of water in ponds and aquaculture environments are increasingly in need of low head, high production water circulation and aeration systems. Propellers and impellers, herein referred to collectively as "pellers", provide the necessary thrust in different ways. A propeller is a fan which propels a fluid by pushing, converting rotational motion into linear motion. An impeller is a rotor that produces a suction force to convert motion in a similar fashion. Impellers for moving fluids are not new, and many different forms of impellers have been devised for moving water. Prior mechanisms and farm systems have used different types of conventional peller (including propeller and impeller) devices for circulating the water into and out of the container in which the fish are raised. Conventional peller devices, such as centrifugal peller devices, are normally used for these systems; however, these are relatively expensive to operate and have high power requirements relative to the amount of water being pumped or circulated. What is needed is an efficient peller device that can circulate water through ponds, lakes, pools, and other bodies of water. Further desirable is a peller device with increased efficiency, thus reducing power requirements.

The present invention addresses these issues. An objective of the peller blade with a flap is to provide a flap structure for a peller blade. The flap of the present invention is an addition to the blade tip which propels a fluid by pushing against the fluid, thus enabling the peller to function as a propeller. In addition, the flap facilitates the generation of a sucking force so the peller can also function efficiently as an impeller. The peller assembly can be encased in circular housings having a vertical axis in which the peller assembly is mounted for rotation on the central axis of the housing. The peller assembly is formed with a hub and a plurality of blades symmetrically positioned around the hub. The flap of the present invention is attached to the base of the peller assembly.

DETAILED DESCRIPTION OF THE INVENTION

All illustrations of the drawings are for the purpose of describing selected versions of the present invention and are not intended to limit the scope of the present invention.

Figure 1:
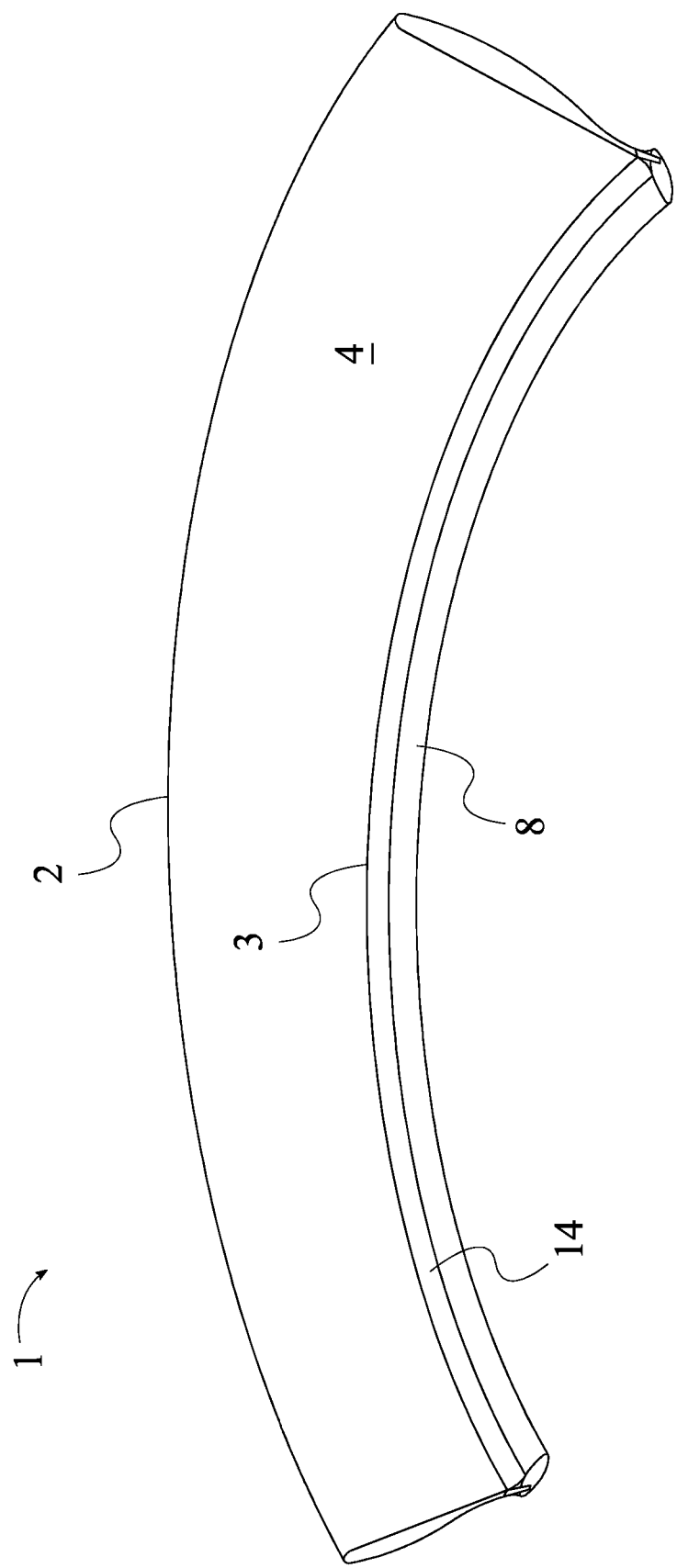
FIG. 1 is a top perspective view of the present invention showing a peller blade with a flap attached to the bottom of the blade.
Figure 7:
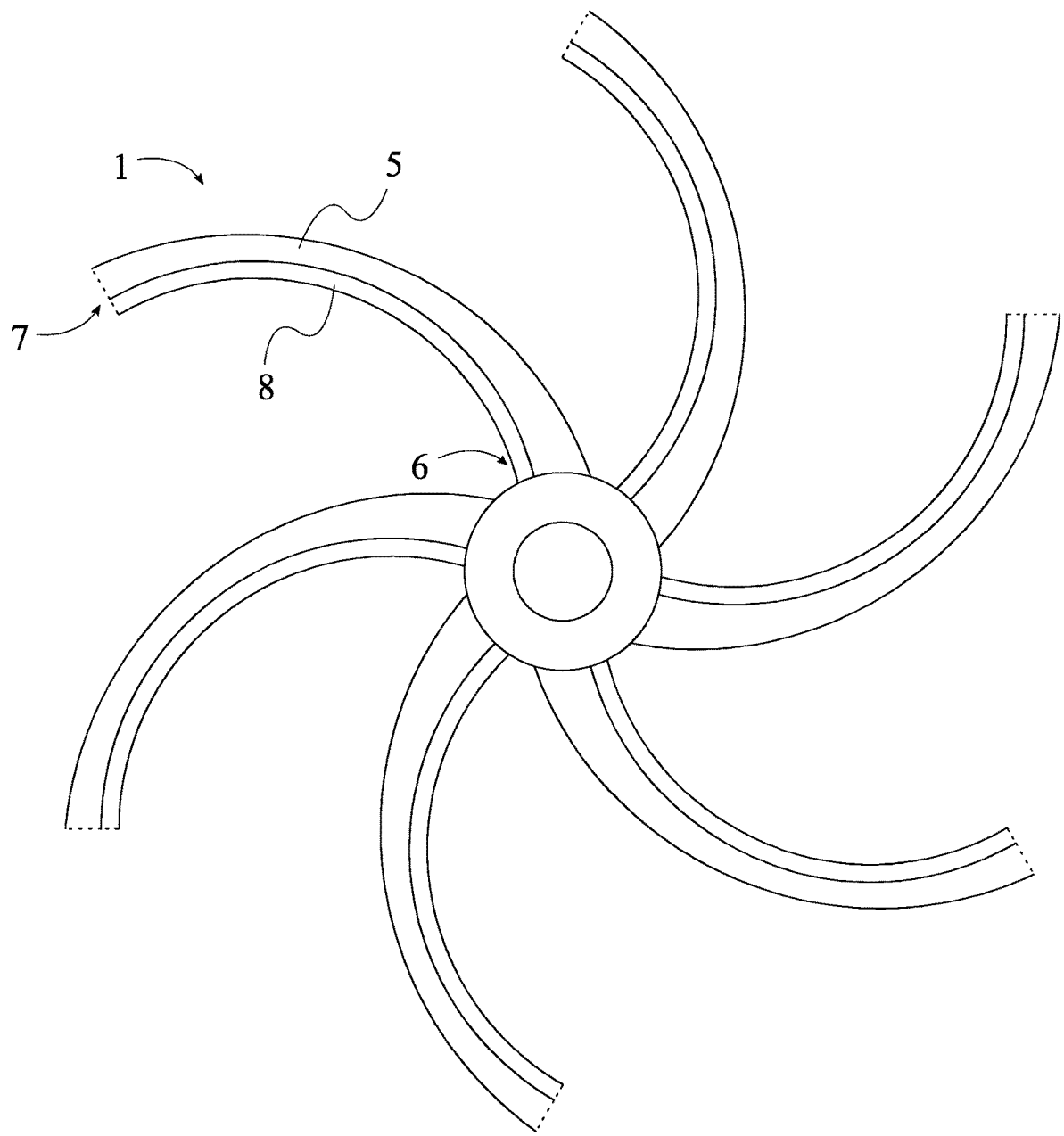
FIG. 7 is a top plan view of an exemplary embodiment of the present invention.

The present invention is a peller device with a flap that is used to enhance the capabilities and efficiency of water circulation and aeration systems. The present invention is configured to act as both a propeller and an impeller as necessary for a particular water circulation requirement. The present invention comprises a blade body 1 and a flap body 8, as shown in FIGS. 1 and 7. The blade body 1 denotes the volume occupied by a propeller or impeller blade. The blade body 1 may take a variety of shapes, forms, and curvatures as deemed necessary by a particular application. The flap body 8 relates to the volume occupied by a preferably rigid or semirigid generally flat unit that enables further manipulation of fluids in conjunction with that of the blade body 1.

Figure 2:
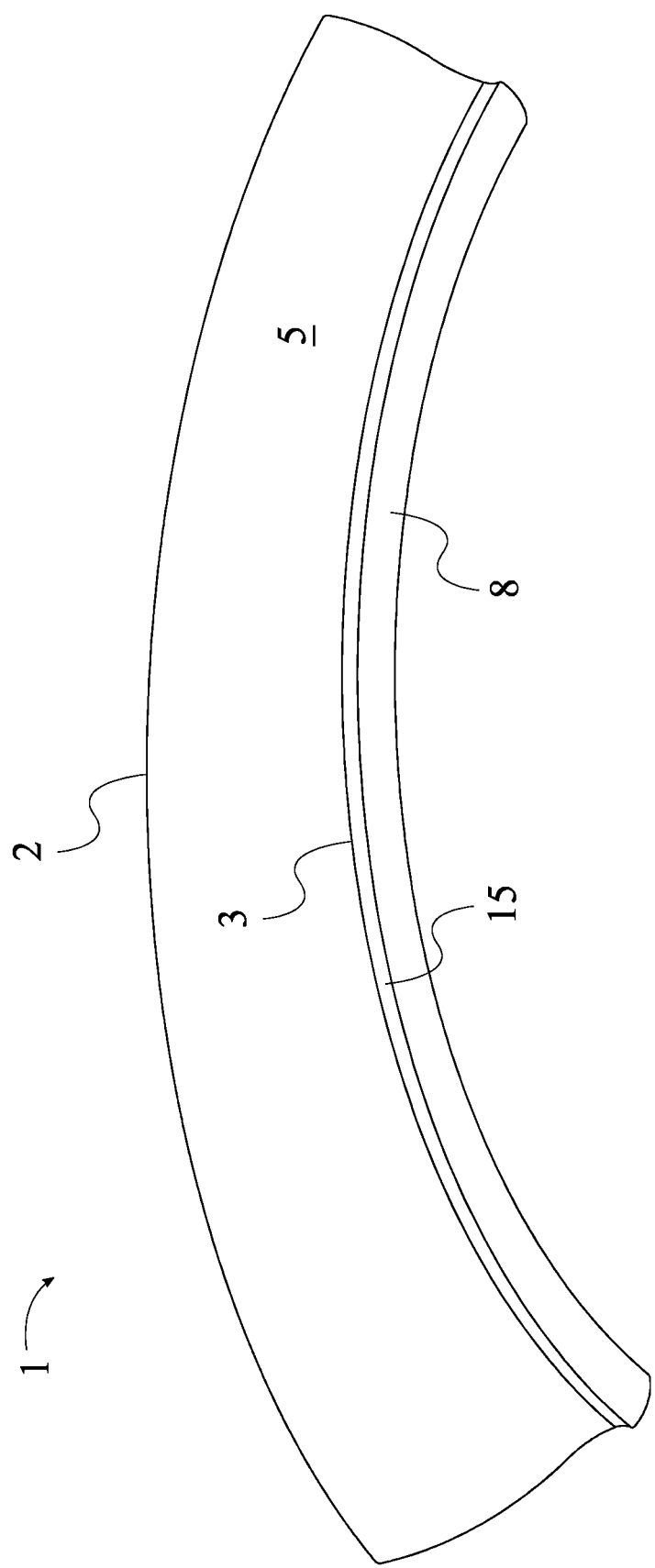
FIG. 2 is a bottom perspective of the present invention.

The general configuration of the aforementioned components allows the present invention to efficiently and effectively push or pull water or other fluids particularly in low head, high production water circulation and aeration systems. The blade body 1 comprises a leading edge 2, a trailing edge 3, a pressure face 4, a suction face 5, a root 6, and a tip 7. The leading edge 2 relates to the section of the blade body 1 that, in the preferred usage of the present invention, precedes the trailing edge 3, pressure face 4, suction face 5, root 6, and tip 7 through the fluid. The trailing edge 3 denotes the section of the blade body 1 which, in the preferred usage of the present invention, follows the leading edge 2, pressure face 4, suction face 5, root 6, and tip 7 through the fluid. The pressure face 4, as shown in FIG. 1, refers to a surface of the blade body 1 which provides pressure to water or a fluid when the present invention is used as a propeller. The suction face 5, as shown in FIG. 2, refers to a surface of the blade body 1 which provides a suction force to water or a fluid when the present invention is used as an impeller. The root 6 denotes the segment of the blade body 1 which may connect to a central hub or main connector of a propeller or impeller. The tip 7 relates to the section of the blade body 1 furthest from the root 6. The flap body 8 comprises a fixed edge 9 and a free edge 10. The fixed edge 9 is the section of the flap body 8 that joins to the blade body 1, enabling connection of the flap body 8 to the blade body 1. The free edge 10 relates to the section of the flap body 8 opposite the fixed edge 9.

Figure 6:
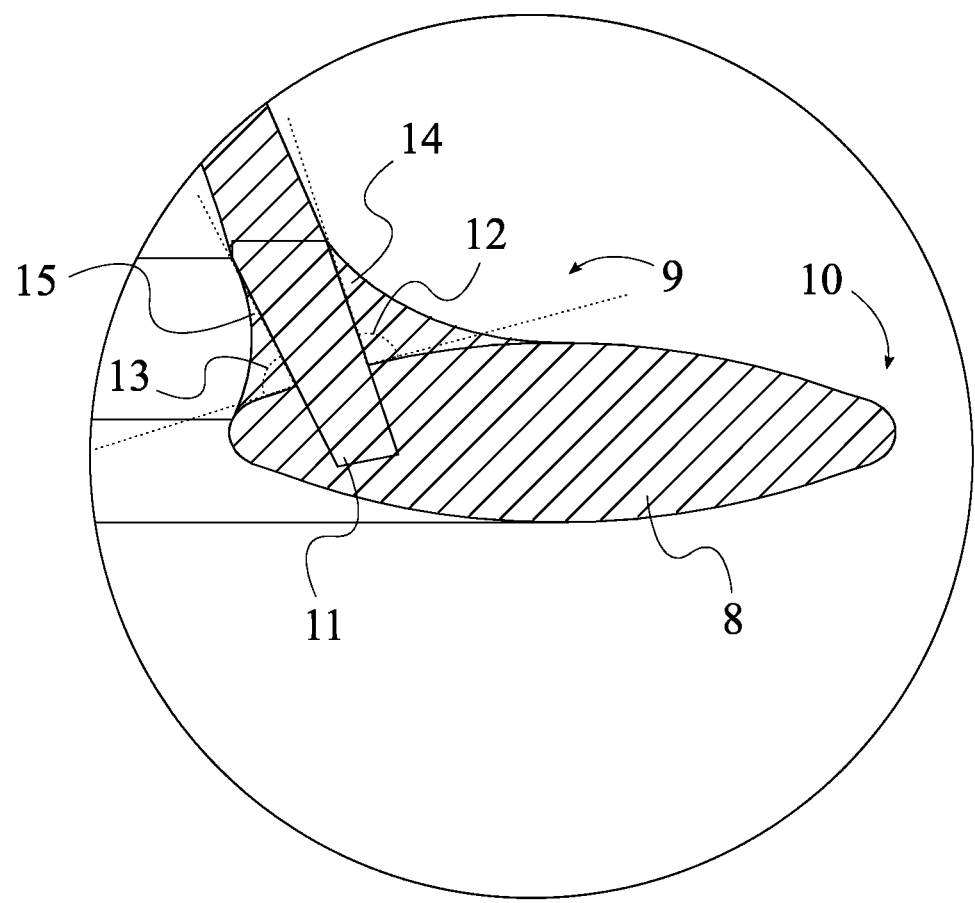
FIG. 6 is a magnified view taken about circle 6 in FIG. 5.

The arrangement of the components of the present invention enables enhanced blade efficiency in propeller and impeller units. The fixed edge 9 is mounted along the trailing edge 3, as shown in FIG. 6. In this way, the flap body 8 is oriented to affect a fluid after the fluid has been manipulated by the blade body 1. The fixed edge 9 is positioned adjacent to the pressure face 4. Thus, the fixed edge 9 and, consequently, the flap body 8 may contribute to the pushing or pulling of the propeller or impeller. The free edge 10 is positioned offset from the pressure face 4. This arrangement ensures that the full flap body 8 may affect fluid as the fluid passes through the propeller or impeller. A first angle 12 between the pressure face 4 and the flap body 8 is less than a second angle 13 between the suction face 5 and the flap body 8. This arrangement ensures that the flap body 8 is connected so as to affect all fluid passing through the propeller or impeller.

Figure 3:
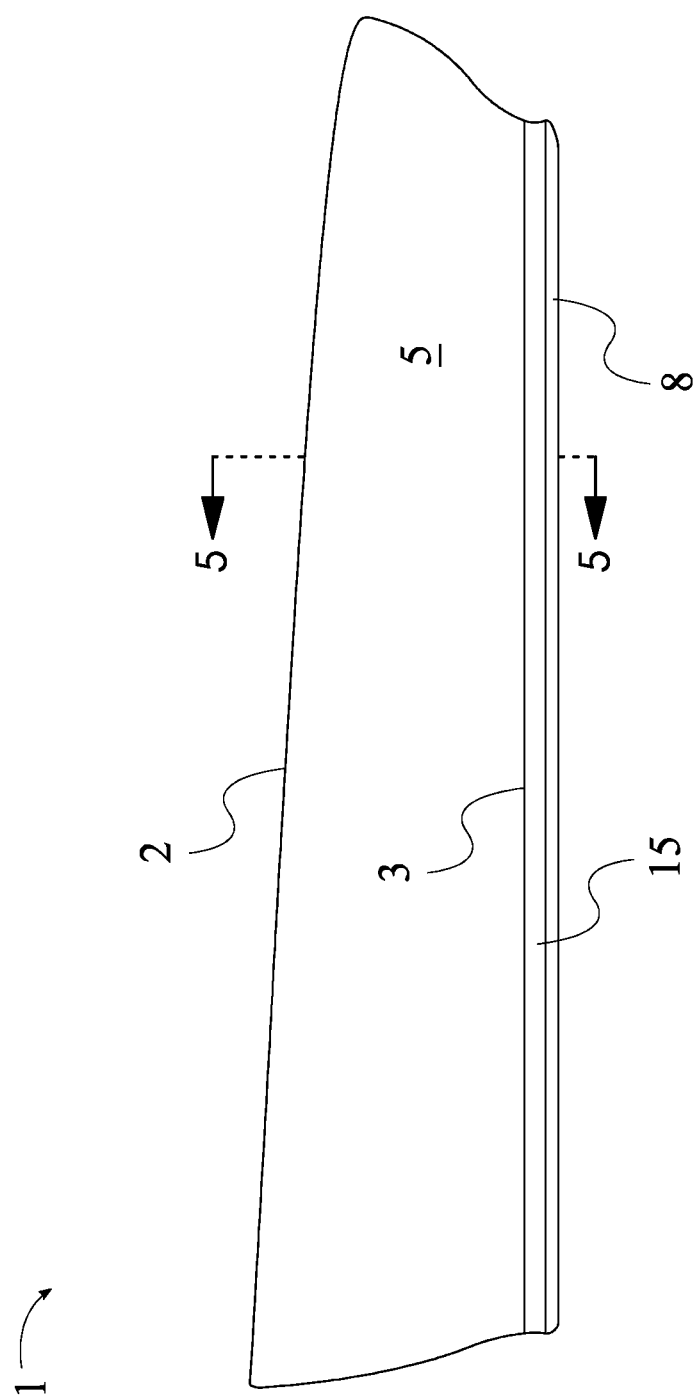
FIG. 3 is a front view of the present invention.
Figure 4:
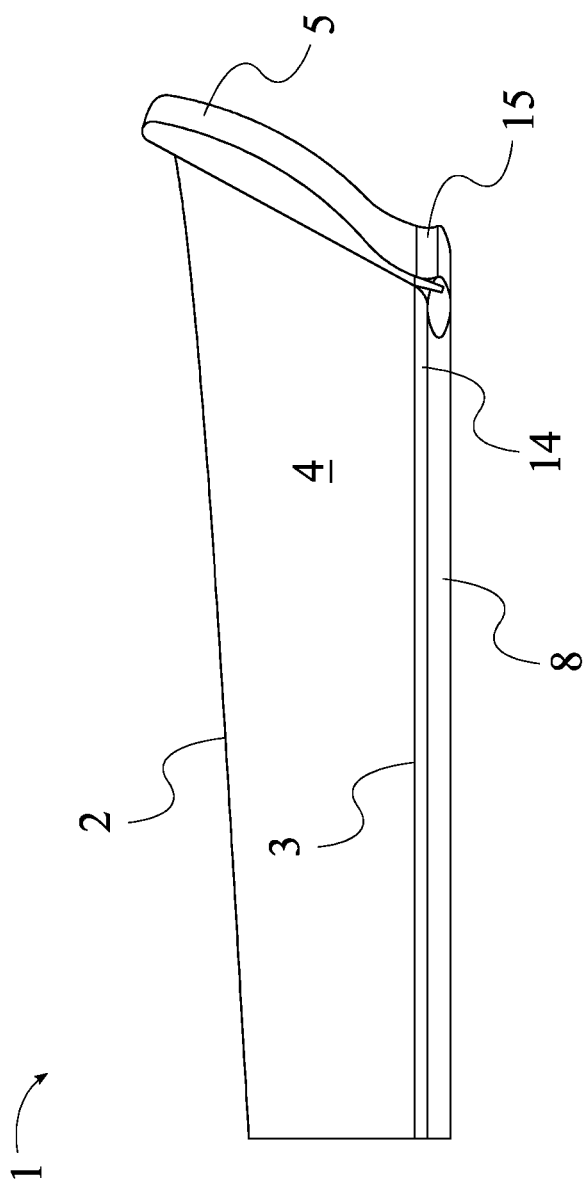
FIG. 4 is a rear view of the present invention.

In order to generate appropriate forces, the present invention requires appropriately curved surfaces that result in conversion of rotational energy into translational energy. To achieve this, the pressure face 4 may be a concave helicoidal surface, as shown in FIG. 4. In this way, the pressure face 4 is shaped to efficiently shift through the water or fluid, resulting in minimal losses due to friction. Similarly, the suction face 5 may be a convex helicoidal surface, as shown in FIG. 3. Thus, the suction face 5 reduces drag that would otherwise reduce the efficiency of the present invention.

The blade body 1 may further take on a variety of shapes that the flap body 8 will have to adapt to. To this end, a curvature path of the blade body 1 may traverse from the root 6 to the tip 7, as shown in FIG. 1. The curvature path is a representative line that traverses through the blade body 1. The flap body 8 is configured to follow the curvature path of the blade body 1. This arrangement ensures that the flap body 8 is able to hydrodynamically move through fluids with the present invention.

Figure 5:
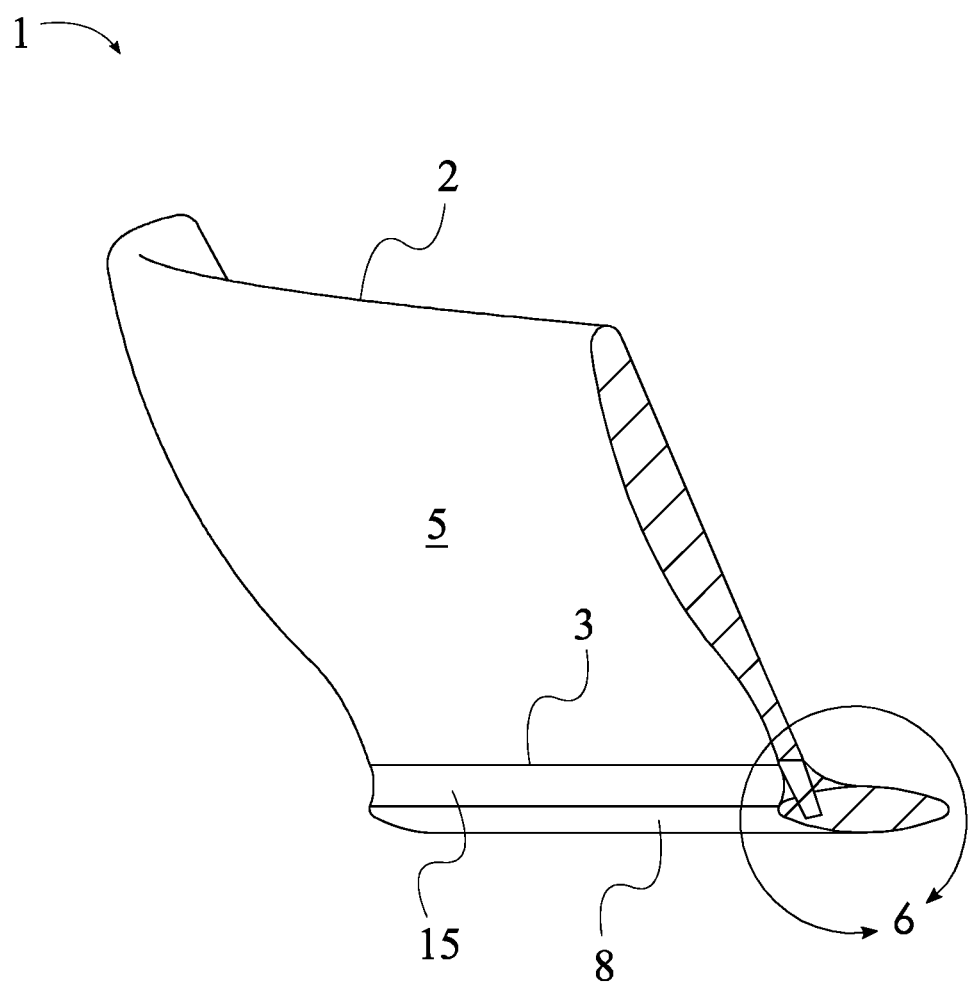
FIG. 5 is a cross-sectional view taken along line 5-5 in FIG. 3.

It may be desirable in many circumstances to provide a blade body 1 which is optimized for rotational speed and thus requires minimization of blade width. To achieve this, a cross-sectional area of the blade body 1 may taper from the tip 7 to the root 6, as shown in FIG. 5. In this way, blade material is minimized without sacrificing the efficiency of the present invention to turn rotational energy into translational force.

Often, sharp angles inhibit the present invention from operating optimally. To prevent this, the present invention may further comprise a first hydrodynamic surface 14, as shown in FIG. 6. The first hydrodynamic surface 14 represents a juncture of the present invention at which, in an exemplary embodiment, the flap body 8 connects to the blade body 1. The first hydrodynamic surface 14 traverses from the pressure face 4, across the first angle 12, and to the flap body 8. This arrangement allows the first hydrodynamic surface 14 to affect the otherwise empty space between the pressure face 4 and the flap body 8. The first hydrodynamic surface 14 is configured to smooth out the first angle 12. In this way, the first angle 12 cannot reduce the flow of water or other fluid as the water flows over the first angle 12.

Rigid angles may similarly impede the present invention from optimal operation. To prevent this, the present invention may further comprise a second hydrodynamic surface 15, as shown in FIG. 6. The second hydrodynamic surface 15 represents a juncture of the present invention at which, in an exemplary embodiment, the flap body 8 connects to the blade body 1, opposite the first angle 12. The second hydrodynamic surface 15 traverses from the suction face 5, across the second angle 13, and to the flap body 8. This arrangement allows the second hydrodynamic surface 15 to affect the otherwise empty space between the suction face 5 and the flap body 8. The second hydrodynamic surface 15 is configured to smooth out the second angle 13. In this way, the second angle 13 cannot reduce the flow of water or other fluid as the water flows over the second angle 13.

The present invention may be made more convenient during setup phases of operation through the separation of vital components. To achieve this, the flap body 8 may further comprise an attachment slot 11, as shown in FIG. 6. The attachment slot 11 relates to a cut into the flap body 8 that functions as a potential attachment mechanism between the flap body 8 and the blade body 1. The attachment slot 11 traverses along the fixed edge 9. In this way, the attachment slot 11 is appropriately positioned to enable connection to the blade body 1. The attachment slot 11 is engaged by the trailing edge 3. This arrangement allows for secure connection of the flap body 8 to the blade body 1.

Although the invention has been explained in relation to its preferred embodiment, it is to be understood that many other possible modifications and variations can be made without departing from the spirit and scope of the invention as hereinafter claimed.

What is claimed is:

1. A peller blade with a flap comprises:
   a blade body;
   a flap body;
   the blade body comprises a leading edge, a trailing edge, a pressure face, a suction face, a root, and a tip;
   the flap body comprises a fixed edge and a free edge;
   the fixed edge being mounted along the trailing edge;
   the fixed edge being positioned adjacent to the pressure face;
   the free edge being positioned offset from the pressure face;
   a first angle between the pressure face and the flap body being less than a second angle between the suction face and the flap body;
   a cross-sectional area of the blade body tapering from the tip to the root;
   the pressure face being a concave helicoidal surface; and
   the suction face being a convex helicoidal surface.

2. The peller blade with a flap as claimed in claim 1 comprises:
   a curvature path of the blade body traversing from the root to the tip; and
   the flap body being configured to follow the curvature path of the blade body.

3. The peller blade with a flap as claimed in claim 1 comprises:
   a first hydrodynamic surface;
   the first hydrodynamic surface traversing from the pressure face, across the first angle, and to the flap body; and
   the first hydrodynamic surface being configured to smooth out the first angle.

4. The peller blade with a flap as claimed in claim 1 comprises:
   a second hydrodynamic surface;
   the second hydrodynamic surface traversing from the suction face, across the second angle, and to the flap body; and
   the second hydrodynamic surface being configured to smooth out the second angle.

5. The peller blade with a flap as claimed in claim 1 comprises:
   the flap body further comprises an attachment slot;
   the attachment slot traversing along the fixed edge; and
   the attachment slot being engaged by the trailing edge.

6. A peller blade with a flap comprises:
   a blade body;
   a flap body;
   the blade body comprises a leading edge, a trailing edge, a pressure face, a suction face, a root, and a tip;
   the flap body comprises a fixed edge, a free edge, and an attachment slot;
   the fixed edge being mounted along the trailing edge;
   the fixed edge being positioned adjacent to the pressure face;
   the free edge being positioned offset from the pressure face;

a first angle between the pressure face and the flap body being less than a second angle between the suction face and the flap body;

the attachment slot traversing along the fixed edge;

the attachment slot being engaged by the trailing edge;

a cross-sectional area of the blade body tapering from the tip to the root;

the pressure face being a concave helicoidal surface; and the suction face being a convex helicoidal surface.

7. The peller blade with a flap as claimed in claim 6 comprises:

a curvature path of the blade body traversing from the root to the tip; and the flap body being configured to follow the curvature path of the blade body.

8. The peller blade with a flap as claimed in claim 6 comprises:

a first hydrodynamic surface;

the first hydrodynamic surface traversing from the pressure face, across the first angle, and to the flap body; and the first hydrodynamic surface being configured to smooth out the first angle.

9. The peller blade with a flap as claimed in claim 6 comprises:

a second hydrodynamic surface;

the second hydrodynamic surface traversing from the suction face, across the second angle, and to the flap body; and the second hydrodynamic surface being configured to smooth out the second angle.

10. A peller blade with a flap comprises:

a blade body;

a flap body;

the blade body comprises a leading edge, a trailing edge, a pressure face, a suction face, a root, and a tip;

the flap body comprises a fixed edge and a free edge;

the fixed edge being mounted along the trailing edge;

the fixed edge being positioned adjacent to the pressure face;

the free edge being positioned offset from the pressure face;

a first angle between the pressure face and the flap body being less than a second angle between the suction face and the flap body;

a curvature path of the blade body traversing from the root to the tip;

the flap body being configured to follow the curvature path of the blade body;

a cross-sectional area of the blade body tapering from the tip to the root;

the pressure face being a concave helicoidal surface; and the suction face being a convex helicoidal surface.

11. The peller blade with a flap as claimed in claim 10 comprises:

a first hydrodynamic surface;

the first hydrodynamic surface traversing from the pressure face, across the first angle, and to the flap body; and the first hydrodynamic surface being configured to smooth out the first angle.

12. The peller blade with a flap as claimed in claim 10 comprises:

a second hydrodynamic surface;

the second hydrodynamic surface traversing from the suction face, across the second angle, and to the flap body; and the second hydrodynamic surface being configured to smooth out the second angle.

13. The peller blade with a flap as claimed in claim 10 comprises:

the flap body further comprises an attachment slot;

the attachment slot traversing along the fixed edge; and the attachment slot being engaged by the trailing edge.

* * * * *